(12) United States Patent
Honsberg-Riedl et al.

(10) Patent No.: US 8,120,269 B2
(45) Date of Patent: Feb. 21, 2012

(54) CIRCUIT ARRANGEMENT AND METHOD FOR OPERATING A HIGH-PRESSURE DISCHARGE LAMP

(75) Inventors: Martin Honsberg-Riedl, Teisendorf (DE); Andreas Huber, Maisach (DE); Simon Lankes, Falkensee (DE); Burkhard Ulrich, Rosenfeld (DE)

(73) Assignee: Osram AG, München (DE)

( * ) Notice: Subject to any disclaimer, the term of this patent is extended or adjusted under 35 U.S.C. 154(b) by 425 days.

(21) Appl. No.: 12/520,090

(22) PCT Filed: Dec. 18, 2006

(86) PCT No.: PCT/EP2006/069812
§ 371 (c)(1),
(2), (4) Date: Jun. 18, 2009

(87) PCT Pub. No.: WO2008/074360
PCT Pub. Date: Jun. 26, 2008

(65) Prior Publication Data
US 2010/0013400 A1    Jan. 21, 2010

(51) Int. Cl.
*H05B 41/36* (2006.01)
*H05B 41/24* (2006.01)
*G03B 21/00* (2006.01)
*G03B 21/14* (2006.01)

(52) U.S. Cl. .................................... 315/246; 353/85
(58) Field of Classification Search ............ 315/246, 315/209 R, 224, 225, 294; 353/85
See application file for complete search history.

(56) References Cited

U.S. PATENT DOCUMENTS

| | | | |
|---|---|---|---|
| 5,109,181 A | 4/1992 | Fischer et al. | |
| 5,608,294 A | 3/1997 | Derra et al. | |
| 5,917,558 A | 6/1999 | Stanton | |
| 6,696,800 B2* | 2/2004 | Kramer et al. | 315/247 |
| 7,887,196 B2* | 2/2011 | Deppe et al. | 353/85 |
| 2001/0030515 A1 | 10/2001 | Huber et al. | |
| 2006/0022613 A1 | 2/2006 | Suzuki et al. | |

FOREIGN PATENT DOCUMENTS

| | | |
|---|---|---|
| DE | 198 29 600 | 9/1999 |
| DE | 100 18 860 | 10/2001 |
| DE | 10 2005 028 417 | 12/2006 |
| DE | 10 2005 059 763 | 6/2007 |

(Continued)

*Primary Examiner* — Daniel D Chang
(74) *Attorney, Agent, or Firm* — Cozen O'Connor

(57) ABSTRACT

A circuit arrangement for operating a high-pressure discharge lamp (12) with an electronic ballast, which is designed to provide an AC feed signal for the high-pressure discharge lamp (12). The AC feed signal comprises, in the time range as modulation period (T), a serial sequence of at least one first signal section (Sa1), one second signal section (Sa2) and one third signal section (Sa3), which are associated with a first, a second and a third color. The AC feed signal is an amplitude-modulated RF signal ($I_{RF}$) with a frequency (f) of at least 500 kHz. The following applies for the envelope (E) of the signal components with a positive and/or negative amplitude: the absolute value of the envelope (E) has a mean amplitude (M); and the first signal section (Sa1) and/or the second signal section (Sa2) and/or the third signal section (Sa3) has/have at least one temporal range in which the absolute value of the envelope (E) is between 5% and 100% greater than the mean amplitude and/or in which the absolute value of the envelope (E) is between 5% and 90% less than the mean amplitude (M).

19 Claims, 7 Drawing Sheets

FOREIGN PATENT DOCUMENTS

| WO | WO 03/098979 | 11/2003 |
| WO | WO 2004/057931 | 7/2004 |
| WO | WO 2006/056926 | 6/2006 |
| WO | WO 2006/068269 | 6/2006 |
| WO | WO 2006/114742 | 11/2006 |
| WO | WO 2007/068601 | 6/2007 |

* cited by examiner

CIRCUIT ARRANGEMENT AND METHOD FOR OPERATING A HIGH-PRESSURE DISCHARGE LAMP

RELATED APPLICATIONS

This is a U.S. national stage of application No. PCT/EP2006/069812, filed on Dec. 18, 2006.

FIELD OF THE INVENTION

The present invention relates to a circuit arrangement for operating a high-pressure discharge lamp with an electronic ballast, which is designed to provide an AC feed signal for the high-pressure discharge lamp, which AC feed signal comprises, in the time range as modulation period, a serial sequence of at least one first signal section, one second signal section and one third signal section, which are associated with a first, a second and a third color. The invention furthermore relates to a projection apparatus with a corresponding circuit arrangement and to a corresponding method for operating a high-pressure discharge lamp.

BACKGROUND OF THE INVENTION

High-pressure discharge lamps as are used, for example, as video projection lamps, generally have two identical electrodes, which are usually in the form of rods. Very disruptive flicker phenomena may arise during operation of such high-pressure discharge lamps on alternating current. These flicker phenomena arise owing to alternating jumping of the root of the arc onto the electrode peaks. This is made possible by the electrode function changing frequently from the anodic phase (positive polarity) to the cathodic phase (negative polarity) at the operating frequency. Such jumping of the arc root in particular impairs
the use of high-pressure discharge lamps in optical devices, for example projection devices, video projectors, microscope lighting and can even result in it not being possible to use these lamps in this application.

U.S. Pat. No. 5,608,294 has disclosed, for low-frequency (50 Hz to a few 100 Hz) operation of a high-pressure discharge lamp, superimposing short synchronous pulses on the square-wave lamp current profile for stabilization purposes, i.e. in order to prevent the root of the arc from jumping. In this case, the current at the end of a half period is increased temporarily prior to subsequent commutation. In accordance with the mentioned document, the current pulse prior to the commutation results in a temporary increase in temperature at the current-conducting roots of the arc on the electrodes, primarily the anode at that time. This results in a material deposition (electrode reformation), i.e. the electrode metal tungsten from the gas cycle process is deposited on the electrodes from the tungsten halides, and a peak is formed on the electrodes, which stabilizes the discharge and the root of the arc very effectively.

WO 03/098979 A1 has disclosed the operation of a high-pressure discharge lamp with an unmodulated RF signal of more than 3 MHz. In general, high-pressure discharge lamps permit successful RF operation only above frequencies which are above the acoustic resonances in the combustion chamber. These acoustic resonances result in strong flows in the combustion chamber which generally considerably disrupt the discharge arc. However, the literature contains attempts to damp
the acoustic resonances by means of suitable feed currents or to completely avoid said resonances. By way of example, reference is made to DE 10 2005 028 417.5 and DE 10 2005 059 763.7. Such solutions are usually very complex, however.

Finally, reference is made to DE 198 29 600 A1, which is concerned with RE operation of a high-pressure discharge lamp. It relates in particular likewise to the problem of the jumping of the root of the arc onto the electrode peaks. Against the background of a prior art in which the high-pressure discharge lamps were operated at a frequency of below 2 kHz, said document proposes the solution of operating the lamp at a frequency above 800 kHz, preferably above 1 MHz and particularly preferably between 2 and 3 MHz. In a preferred development, the operating frequency is wobbled both continuously and suddenly with a modulation frequency of less than 10 kHz, preferably between 1 and 2 kHz. Although this can under some circumstances provide a solution for certain high-pressure discharge lamps, this measure has proven to be ineffective in the case of the high-pressure discharge lamps investigated by the inventors of the present invention.

The basic solution of preventing jumping of the root of the arc onto the electrode peaks during RF operation of a high-pressure discharge lamp is provided in the subsequently published patent application PCT/EP2006/068269 by the same applicant as the present application. The solution consists in the electronic ballast further being designed to modulate the AC feed signal in terms of its amplitude.

The present application is aimed at a preferred use sector of such high-pressure discharge lamps: the known term DLP (digital light processing) is used to describe a technology which is used in video projectors and rear-projection televisions. It is based on microscopically small mirrors which are fitted on a DMD (digital micromirror device) chip. In this case, the mirrors are smaller than a fifth of the width of a human hair. They have two stable end states, between which they can alternate within 16 µs in a preferred embodiment. The movement is brought about by the force effect of electrostatic fields. Owing to the incline of the individual micromirrors on the DMD chip, the light is either reflected directly towards the optical unit or directed towards an absorber. By pulse-width-modulated driving of the mirrors, various brightness levels of the individual pixels can be generated.

DMD chips with an XGA image resolution of 1024×768 contain an arrangement of 786,432 tiny mirrors. In the meantime, DMD chips with resolutions of up to 2048×1080 can be obtained, i.e. approximately two million mirrors.

Since the DMD chips reflect the white light of a projection lamp, additional steps are required for a colored image. In a 1-chip projector, a color wheel is connected into the optical path in front of the DMD chip, with color filters of the primary colors (generally the colors red, green and blue, but sometimes also other colors as well) rotating on said color wheel. In order to achieve improved brightness values in the white region, white is also added to the color wheel. With the position of the color filter, the electronics change
the partial image which is reflected by the DMD. Owing to the rotational speed of the color wheel and the inertia of the human eye, the partial images are added to form a colored image impression. Since the detection frequency is different from human to human, there were reports, primarily in the case of the first models, of a so-called rainbow effect, which occurred when the viewer perceived the individual colors. In a further step, the revolution number of the wheel was therefore doubled and the number of color segments increased in the case of more recent models.

The basic design of such a projection apparatus is provided, for example, in U.S. Pat. No. 5,917,558. FIG. 2 of said document U.S. Pat. No. 5,917,558 shows various pulse control modes for the projection lamp. As can be seen from said figure, these pulses are LF pulses, with a modulation period comprising a serial sequence of a plurality of signal sections which are associated with different colors, in a time range. If a high-pressure discharge lamp is used as a projection lamp, unfortunately the abovementioned undesirable effect of the jumping of the root of the arc onto the electrode peaks occurs during operation with such pulse trains.

Moreover, with such operation, a noticeable dip in the luminous flux and therefore a loss of control of the luminous flux in this period arise despite the rapid commutation of the lamp. This loss of control needs to be avoided in present-day applications by this period being placed in blanking intervals. Furthermore, the procedure in accordance with the prior art displays oscillation phenomena of the luminous flux after the dip in the luminous flux. In this period, the luminous flux can therefore not be controlled and often also cannot be used. The loss of control in modern-day applications disrupts, for example, the color balance and needs to be compensated for by complicated measures in the device.

Further prior art can be found in U.S. Pat. No. 5,109,181, DE 100 18 860 A1 and US 2006/0022613 A1.

SUMMARY OF THE INVENTION

One the object of the present invention is to provide the circuit arrangement mentioned at the outset or the method mentioned at the outset in which jumping of the root of the arc onto the electrode peaks is reliably prevented.

This object can be achieved if an amplitude-modulated RF signal with a frequency of at least 500 kHz is initially used as the AC feed signal. For reasons associated with the EMC, a frequency of approximately 50 MHz is preferably selected as the upper frequency range limit. Moreover, the amplitudes of the signal sections associated with the individual colors should differ from one another such that the effect already mentioned in PCT/EP2006/068269 is produced. In very general terms this means that the following applies for the envelope of the signal components with a positive and/or negative amplitude:

the absolute value of the envelope has a mean amplitude;
the first signal section and/or the second signal section and/or the third signal section has/have at least one temporal range in which the absolute value of the envelope is between 5% and 100% greater than the mean amplitude and/or in which the absolute value of the envelope is between 5% and 90% less than the mean amplitude.

With the procedure according to an embodiment of the invention, it is possible for the emitted luminous flux of the lamp to be subjected to uninterrupted control. This control of the luminous flux takes place very quickly with an extremely short delay and can have high dynamics of the luminous flux modulation. As a result of the extremely quick, uninterrupted control of the luminous flux emitted by the lamp, no interruptions to the luminous flux or transient phenomena occur which can barely be avoided during operation in accordance with the prior art owing to the commutation of the lamp current. The control of the luminous flux can take place in a very simple manner via the level of the amplitude of the feeding RF current in the case of the invention.

The circuit arrangement according to an embodiment of the invention makes it possible to control the luminous flux extremely quickly with a very great modulation depth. As a result, both high dimming dynamics and overbrightening dynamics can be achieved. In addition to the capability of following for example rapidly successive image contents with the corresponding brightness, this is of high importance when precisely mixing the colors with different lamp brightnesses in individual color wheel sectors. Only the possibility of precise dimming or overbrightening of the lamp in the individual color wheel sectors without oscillation phenomena and without spectral reaction which is provided by a circuit arrangement according to the invention allows for extremely precise mixing of colors.

The reasons for which an immediate (<1 s), effective stabilization of the arc during radiofrequency operation can be achieved in principle by an AC feed signal, formed as an amplitude-modulated RF signal with a frequency of at least 500 kHz, are not yet entirely explained at present since, in addition to increases in amplitude, as mentioned, reductions in amplitude also bring about the success in accordance with the invention and result in the avoidance of flicker phenomena of discharge arcs quite generally, and in particular plasma arcs in high-pressure discharge lamps. An indication of this is the fact that a stabilizing peak formation similar to that which results during operation with the circuit arrangement proposed in the mentioned U.S. Pat. No. 5,608,294, is not set until after a few hours. In other words, this means that the actual explanation for the solution according to the invention cannot even be found, or at least not only, in the peak formation.

However, and this is the most important aspect, stabilization can thus be achieved as regards time constancy and location constancy of the discharge arc, and this stabilization satisfies even the stringent optical requirements placed on projection lamps.

In a preferred embodiment, in this case the AC feed signal is a symmetrically amplitude-modulated RF signal, where the absolute value of the envelope of the signal components with a positive amplitude is equal to the absolute value of the envelope of the signal components with a negative amplitude. In an alternative preferred embodiment, the AC feed signal comprises an RF signal and an LF signal with varying amplitude. In this case, the envelope of the RF signal can have a constant amplitude, but it can also have a varying amplitude, where the variation is matched to the variation of the amplitude of the LF signal. Preferred matching can be designed such that an increased amplitude of the LF signal is compensated for by a reduced amplitude of the envelope of the RF signal. As a result, the high-pressure discharge lamp emits a luminous flux with a constant amplitude and is deenergized during substantially shorter periods of time in comparison with the prior art. As a consequence, no flicker phenomena can be perceived by an observer, but reformation of the electrodes takes place, as in the prior art. In a preferred alternative matching process, the amplitude of the envelope of the RF signal and the amplitude of the LF signal can be selected such that a compromise is found between a luminous flux which is as constant as possible and a sufficient electrode reformation.

In general, the absolute value of the envelope of at least one of the signal sections preferably comprises a range of a first amplitude followed by at least one range of a second amplitude, where the absolute value of the second amplitude is less than the absolute value of the first amplitude. In this case, the second amplitude is preferably from 50 to 90%, more preferably 67%, of the first amplitude.

Moreover, a range of a third amplitude can be provided, with the second amplitude being from 50 to 90%, preferably 67%, and the third amplitude being from 2 to 50%, preferably 37%, of the first amplitude.

Particularly preferably, the electronic ballast has a control loop for controlling the RF power emitted to the high-pressure discharge lamp. In the LF circuits used in the prior art, i.e. circuit arrangements which provide an LF signal as the AC feed signal, the feed circuit is measured for this purpose and, from this, a conclusion is drawn regarding the emitted power. However, in circuit arrangements according to the invention which provide an amplitude-modulated RF signal as the AC feed signal, this is unfavorable owing to the variation in the efficiency, in particular as a result of its dependence on the temperature, in a circuit arrangement according to the invention. The control loop therefore preferably comprises an apparatus for determining the actual value of the RF power and a setpoint input apparatus for inputting the setpoint value for the RF power.

Preferably, the apparatus for determining the actual value of the RF power comprises an apparatus for fixing the RF current emitted to the high-pressure discharge lamp, an apparatus for fixing the RF voltage present across the high-pressure discharge lamp, and an apparatus for determining the actual value of the RF power from the RF current and the RF voltage, in particular by analog linking of the RF current and the RF voltage. In particular in the case of the last-mentioned analog linking of the RF current and the RF voltage, the actual value of the RF power can be determined virtually directly without the indirect route of digital calculation. This allows for a control loop which is as quick as possible.

Preferably, the apparatus for fixing the RE current emitted to the high-pressure discharge lamp comprises a first peak-value rectifier, and the apparatus for fixing the RF voltage present across the high-pressure discharge lamp comprises a second peak-value rectifier.

Preferred embodiments of the apparatus for determining the actual value of the RF power represent, for example, a ring mixer or a bridge mixer. In principle, it is thereby possible to realize closed-loop control which is as quick as is allowed by the plasma in the high-pressure discharge lamp.

In a preferred development of the circuit arrangement according to the invention, this circuit arrangement furthermore comprises a frequency-dependent, in particular resonant, load network, which provides the RF current and the RF voltage to the high-pressure discharge lamp depending on the driving frequency, the control loop furthermore comprising an actuator for determining a change in the frequency driving the load network from the difference between the setpoint value and the actual value of the RF power. This allows for particularly rapid closed-loop control.

Particularly advantageous is a design of the control loop which implements the control in a color-specific manner, i.e. separately for at least the first, the second and the third color.

The setpoint input apparatus can be designed to vary the setpoint value to be input to the control loop temporally corresponding to the present color and/or in order to provide reduced light intensities. This makes it possible, with limited stepping of the light valve, to halve or quarter the step amplitude and therefore to double or quadruple the resolution.

Finally, the setpoint input apparatus can have an interface, via which at least one setpoint value can be changed, in particular by a user.

An aspect of the present invention relates to a projection apparatus with a circuit arrangement according to an embodiment of the invention. Such a projection apparatus allows for much improved utilization of the energy emitted to the projection lamp and therefore results in a higher degree of efficiency than in the prior art. This allows the fans provided in such projection apparatuses to be given markedly smaller dimensions, which results in a very desirable reduction in the noise level during operation of such projection apparatuses. The mentioned advantages result from the fact that, when using a circuit arrangement according to the invention, no commutation intervals need to be provided in the profile of the current driving the high-pressure discharge lamp. In the prior art, the light valve needed to be driven, in order to avoid light faults during commutation, in such a way that the light is directed away from the lens and therefore does not arrive at the display.

The preferred embodiments mentioned with reference to the circuit arrangement according to the invention and with reference to the projection apparatus according to the invention and the advantages thereof apply correspondingly, if applicable, to the method according to the invention.

BRIEF DESCRIPTION OF THE DRAWING(S)

Exemplary embodiments of the invention will now be described in more detail below with reference to the attached drawings, in which.

DETAILED DESCRIPTION OF THE DRAWINGS

Figure 1:
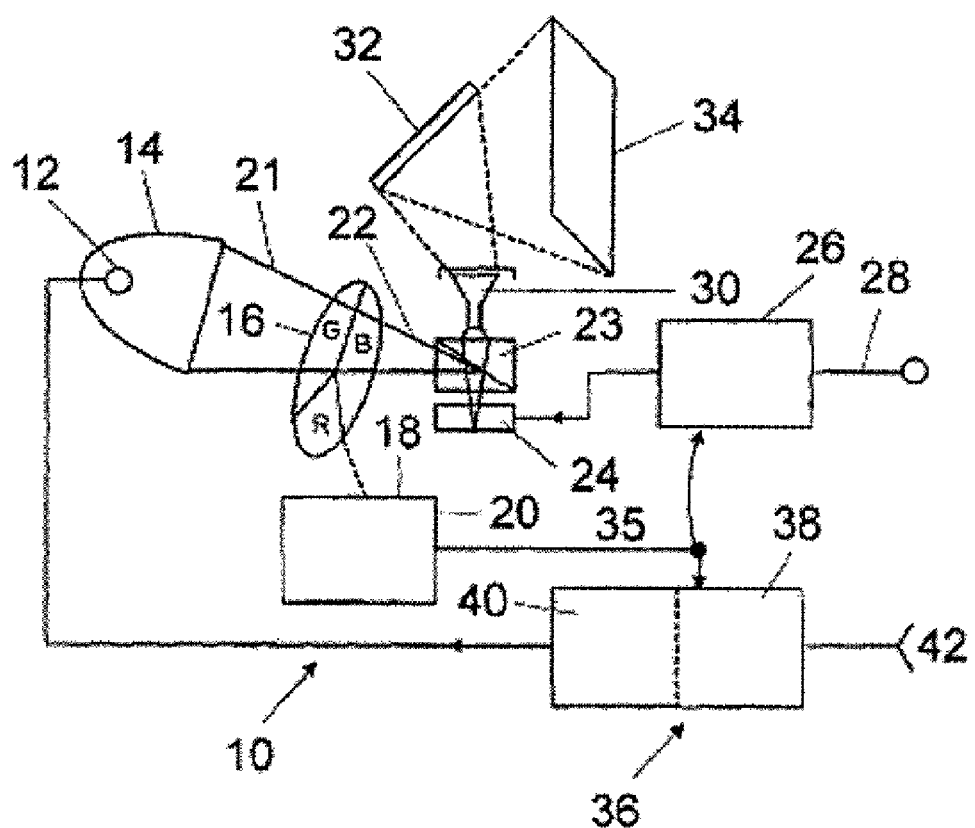
FIG. 1 shows a schematic illustration of the design of a projection apparatus according to an embodiment of the invention.

FIG. 1 shows a schematic illustration of the design of an exemplary embodiment of a projection apparatus 10 according to the invention. This projection apparatus has a high-pressure discharge lamp 12, whose radiated light is directed from a reflector 14 onto a color wheel 16. The color wheel 16 comprises three 120° segments of dichroitic filters of different colors, in this case red, green and blue. The color wheel 16 can rotate about the axis and is driven by a wheel drive system 18, which produces an output signal 20 which is representative of the position of the color wheel 16 and consequently of the relevant color which is in the output beam 21 of the high-pressure discharge lamp 12. The output beam 22 after the color wheel 16 is in this case sequentially red, green and blue. The output beam 22 is directed through a beam splitter 23 onto the surface of a light valve 24, which in this example is a deformable mirror device. The impinging beam 22 of colored light is modulated corresponding to the video information provided by the light valve 24 by means of a light valve controller 26, which receives the video information from a video signal input 28. The modulated beam of colored light which is reflected on the surface of the light valve 24 is focused on a mirror 32 by a projection lens 30 and is reflected towards a reproduction screen 34. During operation, each color is projected sequentially onto the light valve, is modulated by the light valve 24 with the specific video information for this color and projected onto the screen 34. The colored images follow one another so quickly that the eye integrates the individual images to form a complete colored image.

The information on the position of the color wheel is provided via a line 35 to a control loop 38 and the valve controller 26, which, together with an apparatus 40 for determining the actual value of the RF power, is combined in a circuit arrangement 36. This circuit arrangement 36 furthermore comprises an interface 42, via which a user has the option of setting the relative component of the colors in the output signal of the apparatus 40 for measuring the RF power with which the high-pressure discharge lamp 12 is driven, for example in a region-specific manner.

Figure 2:
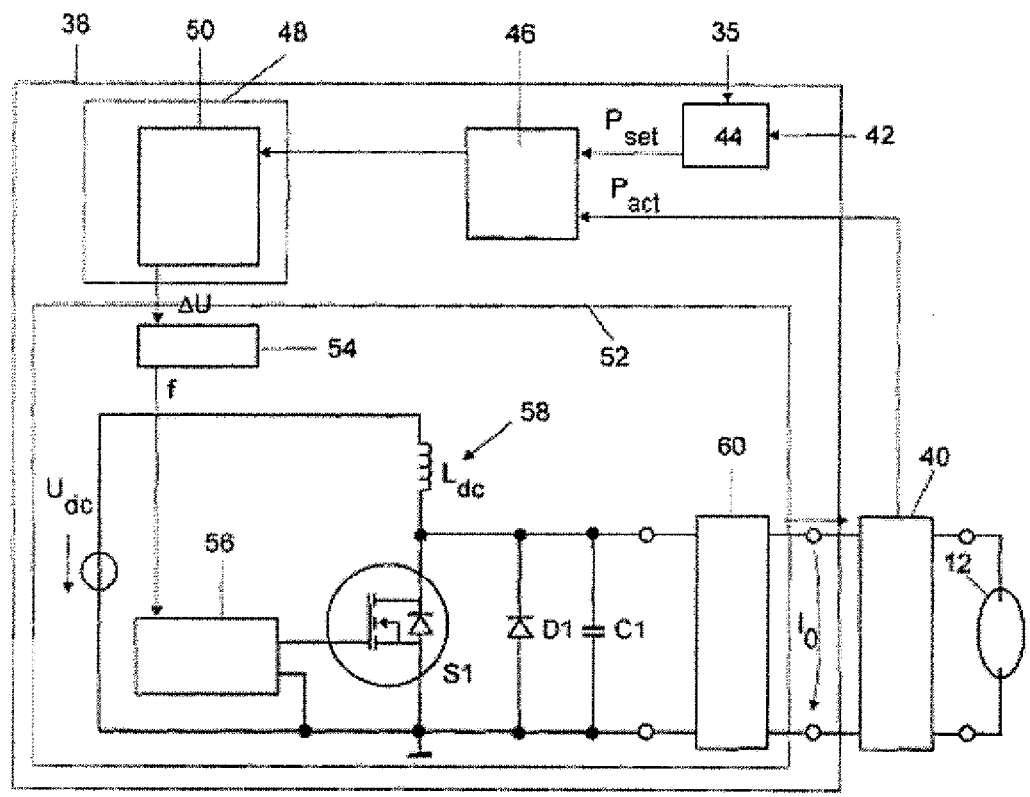
FIG. 2 shows a schematic illustration of the design of a control loop used in the illustration in FIG. 1 for controlling the RF power emitted to the high-pressure discharge lamp.

FIG. 2 shows a more detailed illustration of the control loop 38 in FIG. 1 in accordance with a preferred exemplary embodiment. It has a setpoint input apparatus 44 which inputs a setpoint value $P_{set}$ for the RF power to a differentiating apparatus 46, which moreover is supplied the actual value $P_{act}$ of the RF power. This differentiating apparatus determines the control discrepancy $\Delta P$ and supplies this to an actuator 48, which in this case comprises a unit 50 in order to determine a manipulated variable $\Delta U$ from the control discrepancy $\Delta P$. The block 50 can reproduce a look-up table or a formulaic relationship between $\Delta P$ and $\Delta U$.

The controlled variable $\Delta U$ is supplied to a control path 52, which provides the RF signal driving the high-pressure discharge lamp 12 at its output. In this case, the control path 52 comprises a VCO (voltage controlled oscillator) 54. At its output, the VCO 54 provides, corresponding to the changed voltage at its input, a signal with a changed frequency f, which is supplied to a control unit 56 in order to generate the signal, via the driving of a switch S1, which signal is used to drive the high-pressure discharge lamp 12. The radiofrequency switching stage which in this exemplary embodiment is in the form of a class E switching stage with zero voltage switching, comprises a DC voltage source $U_{dc}$, an inductance $L_{dc}$, a diode D1 and a capacitor C1, in addition to the control apparatus 56. As is obvious to a person skilled in the art, other designs of the RF switching stage can be provided, for example in the form of a push-pull RF switching stage with zero voltage switching, in the form of an RF half bridge with zero voltage switching or the like.

The control path 52 furthermore comprises a resonant load filter 60, which in this case is intended to enable operation with zero voltage switching (ZVS). At the output of the control path 52, the high-pressure discharge lamp 12 is provided with an RF voltage $U_0$ and an RF current $I_0$ via the above-mentioned apparatus 40 for determining the actual value of the RF power. Particularly preferred examples of embodiments of the apparatus 40 for determining the actual value of the RF power are illustrated in FIGS. 3, 4 and 5.

Figure 3:
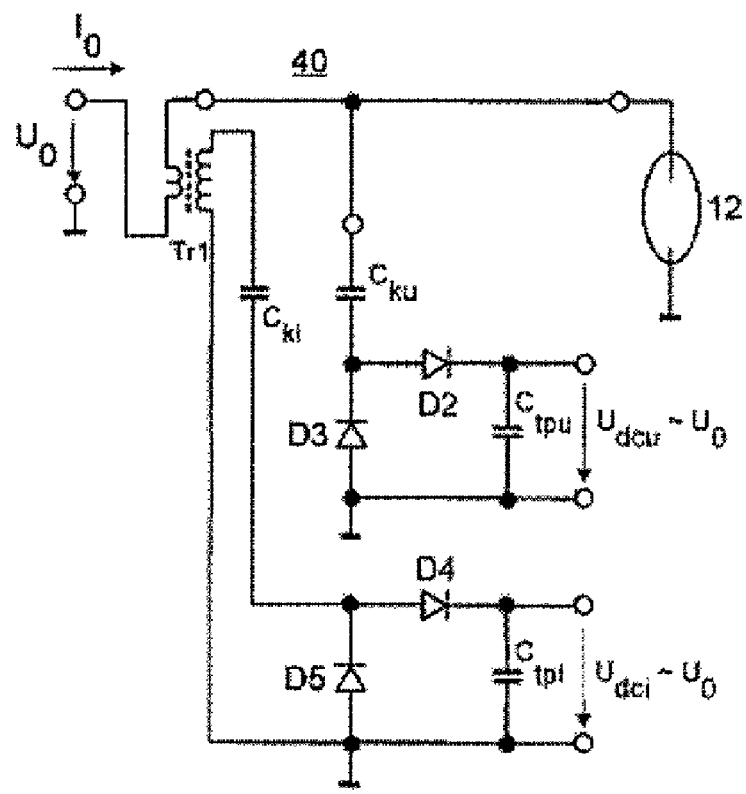
FIG. 3 shows a first exemplary embodiment of an apparatus for determining the actual value of the RF power used in the illustration in FIG. 2.

FIG. 3 shows a first exemplary embodiment of an apparatus 40 for determining the actual value of the RF power. This embodiment functions without taking into consideration the phase. The RF current $I_0$ and the RF voltage $U_0$ are each independently converted into a DC voltage $U_{dci}$, which is proportional to the RF current $I_0$, and $U_{dcu}$, which is proportional to the RF voltage $U_0$, by means of double peak-value rectification. If the high-pressure discharge lamp 12, which is likewise shown for illustrative purposes, predominantly demonstrates a resistive response, this procedure is entirely sufficient for the determination of the power and the closed-loop control of the power. It comprises a transformer Tr1, which feeds a subcircuit which is designed for determining $U_{dci}$. This subcircuit comprises a capacitor $C_{ki}$, two diodes D4 and D5 and a further capacitor $C_{tpi}$. The other subcircuit is used for providing the voltage $U_{dcu}$, which structurally has the same design as the subcircuit mentioned first. The components used there have the designations $C_{ku}$, D2, D3 and $C_{tpu}$.

Figure 4:
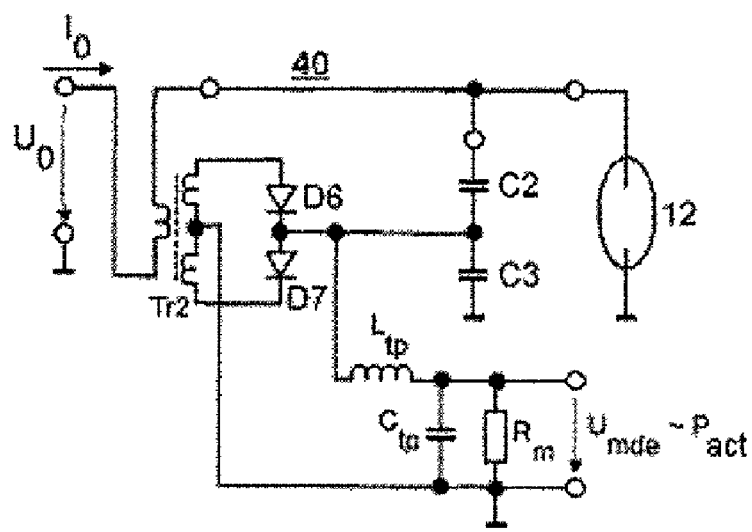
FIG. 4 shows a second exemplary embodiment of an apparatus for determining the actual value of the RF power used in the illustration in FIG. 2.

FIG. 4 shows a second exemplary embodiment of an apparatus 40 for measuring the actual value of the RF power. It is in the form of a bridge mixer circuit, which, in contrast to the exemplary embodiment in FIG. 3, now takes into consideration the phase between the RF current $I_0$ and the RF voltage $U_0$. It comprises a transformer Tr2, two diodes D6, D7, three capacitors C2, C3, $C_{tp}$, an inductance $L_{tp}$ and a measuring resistor $R_m$. At its output, the measured voltage $U_{mdC}$ is provided which comprises the scalar product of the RF current $I_0$ and the RF voltage $U_0$. Precise closed-loop control of the power can therefore also be realized in the case of a non-resistive load response of the high-pressure discharge lamp 12.

Figure 5:
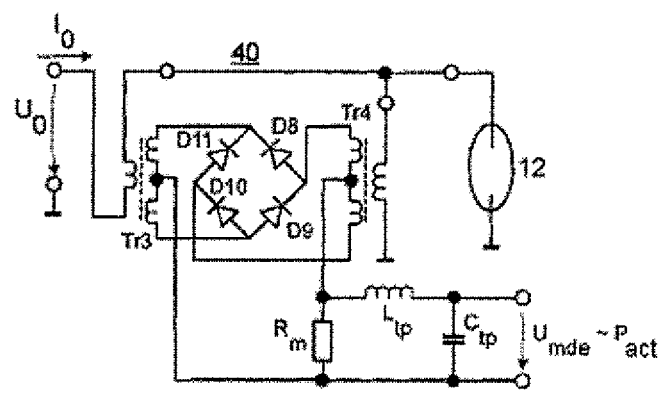
FIG. 5 shows a third exemplary embodiment of an apparatus for determining the actual value of the RF power used in the illustration in FIG. 2.

FIG. 5 shows a third exemplary embodiment of an apparatus 40 for measuring the actual value of the RF power. It is in the form of a ring mixer circuit and, in the same way as the exemplary embodiment in FIG. 4, allows the determination of the actual value of the RF power whilst taking into consideration the phase between the RF current and the RF voltage. It makes it possible to determine the active power and therefore the closed loop control of the power of nonresistive loads. It comprises two transformers Tr3, Tr4, four diodes D8, D9, D10, D11, a capacitor $C_{tp}$, an inductance $L_{tp}$ and a measuring resistor $R_m$.

Figure 6:
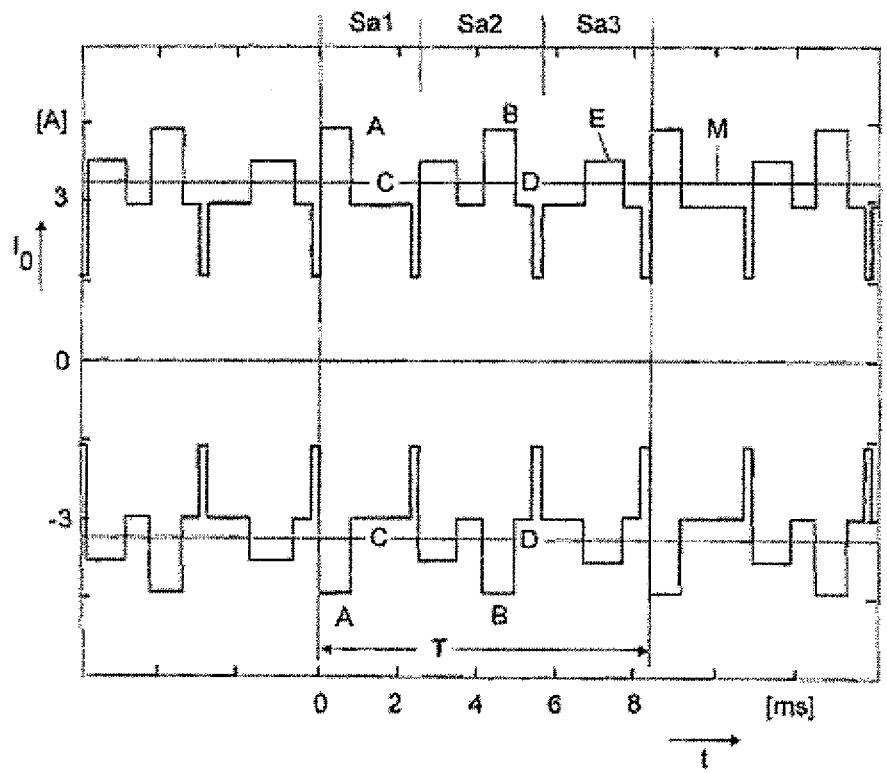
FIG. 6 shows a schematic illustration of the time profile of an AC feed signal for the high-pressure discharge lamp in accordance with a first exemplary embodiment.

FIG. 6 shows the time profile of the RF current $I_0$ with which the high-pressure discharge lamp 12 is fed. The sinusoidal radiofrequency oscillation is in this case illustrated by shading between the continuous envelope E. The modulation period T is in this case 8.33 ms (120 Hz). It is repeated continuously and does not change. In order to promote light contrast, three short dips are provided per modulation period T. As is indicated at the upper edge of the graph illustrated, a modulation period T has three temporally successive signal sections Sa1, Sa2, Sa3, which are associated with three different colors, namely in the exemplary embodiment the colors green, red and blue. The mean amplitude M of the envelope E is also shown. As can clearly be seen, the profile does not have any commutation gaps.

Figure 7:
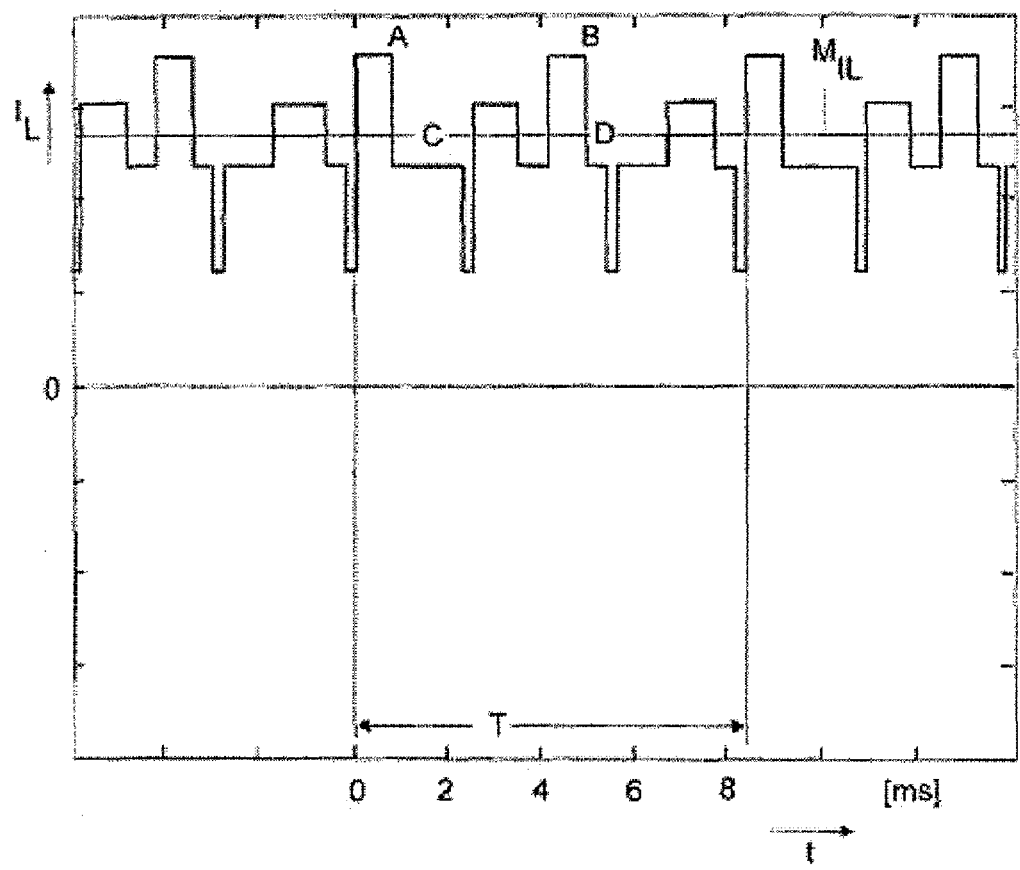
FIG. 7 shows a schematic illustration of the time profile of the luminous flux associated with the time profile of the RF current in FIG. 6.

FIG. 7 shows the luminous flux associated with the time profile of the RF current in FIG. 6. In FIG. 7, the average luminous flux $M_{IL}$ is also shown. Consideration of the time profile of the current $I_0$ and of the luminous flux $I_L$ in FIGS. 6 and 7 shows considerable fluctuations in power, for example from the region A to the region C and from the region B to the region D.

Figure 8:
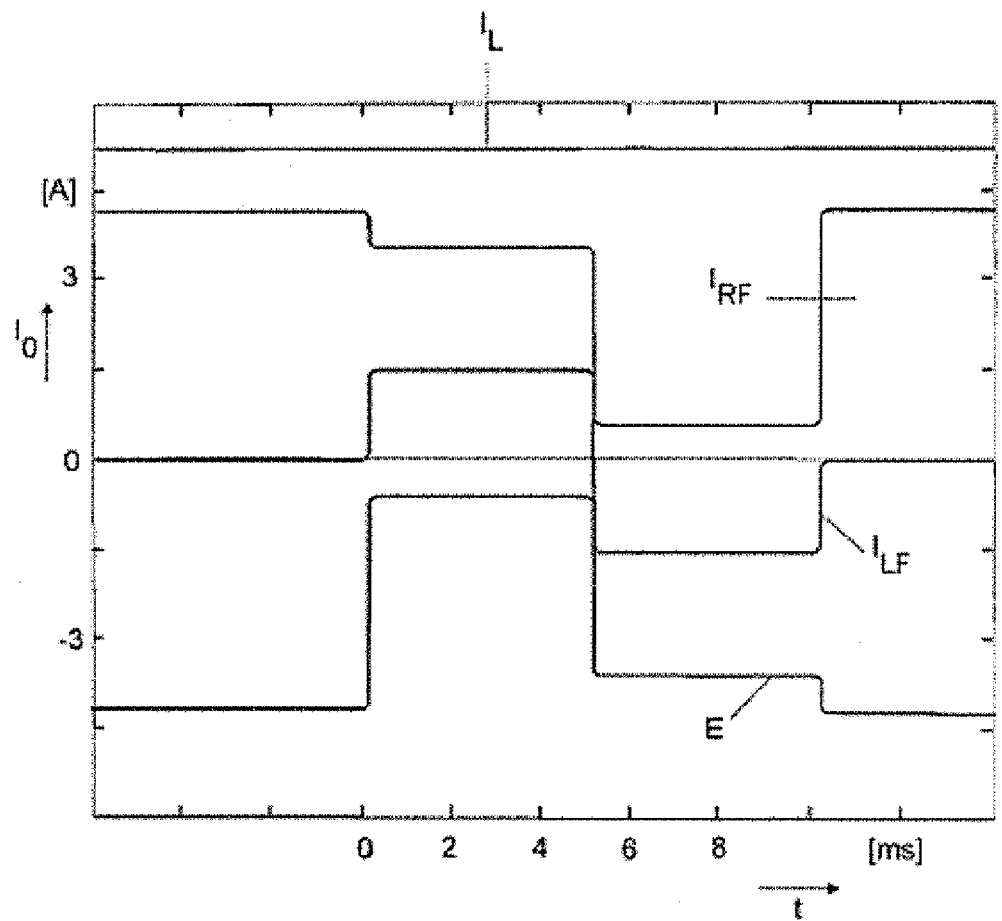
FIG. 8 shows a schematic illustration of the time profile of an AC feed signal for the high-pressure discharge lamp in accordance with a second exemplary embodiment.

FIG. 8 shows a second exemplary embodiment of the time profile of the current $I_0$, which in this case comprises an RF signal and an LF signal. In this case, the envelope E of the RF signal has a varying amplitude, which is matched to the varying amplitude of the LF signal in such a way that a constant luminous flux $I_L$ results. In the illustration in FIG. 8, the uppermost continuous line of the signal profile and the lowermost continuous line of the signal profile form the envelope E. It is obvious that the time profile of the LF component $I_{LF}$ changes its mathematical sign in two successive periods.

Figure 9:
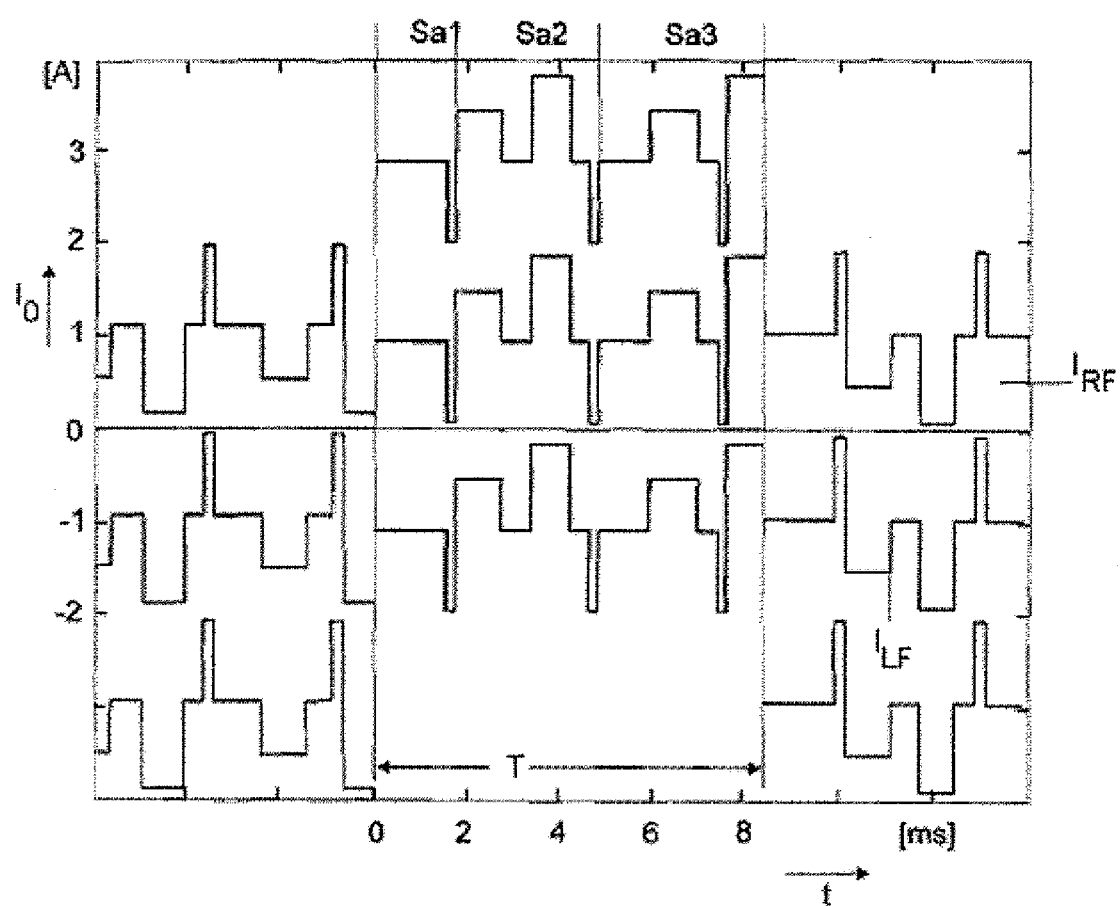
FIG. 9 shows a schematic illustration of the time profile of an AC feed signal for the high-pressure discharge lamp in accordance with a third exemplary embodiment.

FIG. 9 shows a third exemplary embodiment of the time profile of the current $I_0$, which in this case, as in the exemplary embodiment in FIG. 8, comprises an RF signal and an LF signal. In this case, the envelope of the RF signal again has a constant amplitude, and the LF signal has a varying amplitude. This amplitude comprises the profile of an LF signal $I_{LF}$ drawn in bold, with an RF signal $I_{RF}$ of constant amplitude super-imposed thereon. Again the signal sections Sa1, Sa2, Sa3 associated with three colors are shown.

| Color wheel revolution No. | Color sequence | Current amplitude (relative) | Duration [µs] | Duration (relative) | Revolution duration [µs] |
|---|---|---|---|---|---|
| 1 | Y1 - Yellow | 87.18% | 602 | 14.45% | 4136 |
| 1 | M1 - Magenta | 87.18% | 409 | 9.82% | |
| 1 | G1 - Green | 87.18% | 567 | 13.61% | |
| 1 | GND50 - Green dark (near dark) | 41.51% | 132 | 3.17% | |
| 1 | R1 - Red | 113.12% | 1015 | 24.36% | |
| 1 | C1 - Cyan | 87.18% | 589 | 14.13% | |
| 1 | B1 - Blue | 130.77% | 822 | 19.73% | |
| 2 | Y2 - Yellow | 87.18% | 497 | 11.93% | 4198 |
| 2 | YND50 - Yellow dark (near dark) | 41.51% | 123 | 2.95% | |
| 2 | M2 - Magenta | 87.18% | 409 | 9.82% | |
| 2 | G2 - Green | 87.18% | 721 | 17.30% | |
| 2 | R2 - Red | 113.12% | 1033 | 24.79% | |
| 2 | C2 - Cyan | 87.18% | 492 | 11.81% | |
| 2 | CND50 - Cyan dark (near dark) | 40.48% | 119 | 2.86% | |
| 2 | B2 - Blue | 130.77% | 804 | 19.29% | |
| 3 | Y3 - Yellow | 87.18% | 602 | 14.45% | 4136 |
| 3 | M3 - Magenta | 87.18% | 409 | 9.82% | |
| 3 | G3 - Green | 87.18% | 567 | 13.61% | |
| 3 | GND50 - Green dark (near dark) | 41.51% | 132 | 3.17% | |
| 3 | R3 - Red | 113.12% | 1015 | 24.36% | |
| 3 | C3 - Cyan | 87.18% | 589 | 14.13% | |
| 3 | B3 - Blue | 130.77% | 822 | 19.73% | |
| 4 | Y4 - Yellow | 87.18% | 497 | 11.93% | 4198 |
| 4 | YND50 - Yellow dark (near dark) | 41.51% | 123 | 2.95% | |
| 4 | M4 - Magenta | 87.18% | 409 | 9.82% | |
| 4 | G4 - Green | 87.18% | 721 | 17.30% | |
| 4 | R4 - Red | 113.12% | 1033 | 24.79% | |
| 4 | C4 - Cyan | 87.18% | 492 | 11.81% | |
| 4 | CND50 - Cyan dark (near dark) | 40.48% | 119 | 2.86% | |
| 4 | B4 - Blue | 130.77% | 804 | 19.29% | |

The above table represents an implemented sequence of light modulation in a rear-projection television which uses a six-segment color wheel with the colors red, green, blue, yellow, magenta, cyan. The color wheel has, as mentioned, six segments of different colors, with the different states, for example "Green dark" or "Yellow dark", being generated by dimming the high-pressure discharge lamp. The frequency has four different cycles which are reproduced below by the numbers of the color wheel revolution. The table gives the relative current amplitude, the duration in µs, the relative duration in % and the duration of the revolution of the corresponding cycle. The operating RF frequency is 5.6 MHz.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for operating a high-pressure discharge lamp with an electronic ballast, which is designed to provide an AC feed signal for the high-pressure discharge lamp, which AC feed signal comprises, in the time range as modulation period, a serial sequence of at least one first signal section, one second signal section and one third signal section, which are associated with a first, a second and a third color, wherein the AC feed signal is an amplitude-modulated RF signal with a frequency of at least 500 kHz, where the following applies for the envelope of the signal components with a positive and/or negative amplitude:

the absolute value of the envelope has a mean amplitude; and the first signal section and/or the second signal section and/or the third signal section has/have at least one temporal range in which the absolute value of the envelope is between 5% and 100% greater than the mean amplitude and/or in which the absolute value of the envelope is between 5% and 90% less than the mean amplitude.

2. The circuit arrangement as claimed in claim 1, wherein the AC feed signal is a symmetrically amplitude-modulated RF signal, where the absolute value of the envelope of the signal components with a positive amplitude is equal to the absolute value of the envelope of the signal components with a negative amplitude.

3. The circuit arrangement as claimed in claim 1, wherein the AC feed signal comprises an RF signal and an LF signal with varying amplitude.

4. The circuit arrangement as claimed in claim 3, wherein the envelope of the RF signal has a constant amplitude.

5. The circuit arrangement as claimed in claim 3, wherein the envelope of the RF signal has a varying amplitude, where the variation is matched to the variation of the amplitude of the LF signal.

6. The circuit arrangement as claimed in claim 1, wherein the absolute value of the envelope of at least one of the signal sections comprises a range of a first amplitude followed by at least one range of a second amplitude, where the absolute value of the second amplitude is less than the absolute value of the first amplitude.

7. The circuit arrangement as claimed in claim 6, wherein the second amplitude is from 50 to 90% of the first amplitude.

8. The circuit arrangement as claimed in claim 6, wherein a range of a third amplitude is provided, with the second amplitude being from 50 to 90%, and the third amplitude being from 2 to 50% of the first amplitude.

9. The circuit arrangement as claimed in claim 1, wherein the electronic ballast comprises a control loop for controlling the RF power emitted to the high-pressure discharge lamp.

10. The circuit arrangement as claimed in claim 9, wherein the control loop comprises:
- an apparatus for determining the actual value of the RF power; and
- a setpoint input apparatus for inputting the setpoint value for the RF power.

11. The circuit arrangement as claimed in claim 10, wherein the apparatus for determining the actual value of the RF power comprises a ring mixer or a bridge mixer.

12. The circuit arrangement as claimed in claim 10, wherein the apparatus for determining the actual value of the RF power comprises:
- an apparatus for fixing the RF current emitted to the high-pressure discharge lamp;
- an apparatus for fixing the RF voltage present across the high-pressure discharge lamp; and
- an apparatus for determining the actual value of the RF power from the RF current and the RF voltage.

13. The circuit arrangement as claimed in claim 12, wherein the apparatus for fixing the RF current emitted to the high-pressure discharge lamp comprises a first peak-value rectifier, and the apparatus for fixing the RF voltage present across the high-pressure discharge lamp comprises a second peak-value rectifier.

14. The circuit arrangement as claimed in claim 10, further comprising a frequency-dependent load network, which provides the RF current and the RF voltage to the high-pressure discharge lamp depending on the driving frequency, the control loop furthermore comprising:
- an actuator for determining a change in the frequency driving the load network from the difference between the setpoint value and the actual value of the RF power.

15. The circuit arrangement as claimed in claim 10, wherein the control loop is designed adapted to implement the control in a color-specific manner, i.e. separately for at least the first, the second and the third color.

16. The circuit arrangement as claimed in claim 15, wherein the setpoint input apparatus is adapted to vary the setpoint value to be input to the control loop temporally corresponding to the present color.

17. The circuit arrangement as claimed in claim 10, wherein the setpoint input apparatus has an interface, via which at least one setpoint value ($P_{set}$) can be changed.

18. A projection apparatus comprising a circuit arrangement as claimed in claim 1.

19. A method for operating a high-pressure discharge lamp using a circuit arrangement, comprising:
- driving the high-pressure discharge lamp with an AC feed signal, which, in the time range as modulation period, comprises a serial sequence of at least one first signal section, one second signal section and one third signal section, which are associated with a first, a second and a third color, the AC feed signal being an amplitude-modulated RF signal with a frequency of at least 500 kHz, where the following applies for the envelope of the signal components with a positive and/or negative amplitude:
- the absolute value of the envelope has a mean amplitude; and
- the first signal section and/or the second signal section and/or the third signal section has/have at least one temporal range in which the absolute value of the envelope is between 5% and 100% greater than the mean amplitude and/or in which the absolute value of the envelope is between 5% and 90% less than the mean amplitude.

* * * * *